United States Patent [19]

Uehara et al.

[11] Patent Number: 4,504,616
[45] Date of Patent: Mar. 12, 1985

[54] NEODYMIUM-CONTAINING TRANSPARENT RESIN AND METHOD FOR MANUFACTURE THEREOF

[75] Inventors: Hiroshi Uehara, Nakajo; Tohru Shimizu, Kokubunji, both of Japan

[73] Assignee: Kyowa Gas Chemical Industry Co., Ltd., Tokyo, Japan

[21] Appl. No.: 518,078

[22] Filed: Jul. 28, 1983

[30] Foreign Application Priority Data

Jul. 30, 1982 [JP] Japan ................................ 57-132119
May 25, 1983 [JP] Japan ................................ 58-90607

[51] Int. Cl.$^3$ ............................................. C08K 5/09
[52] U.S. Cl. ................................... 524/398; 524/287; 524/322; 524/321; 524/320; 525/360; 525/330.2
[58] Field of Search ............... 524/398, 287, 322, 321, 524/320; 525/360, 330.2

[56] References Cited

U.S. PATENT DOCUMENTS 4,296,214 10/1981 Kamada et al. ..................... 524/398

FOREIGN PATENT DOCUMENTS 58444 5/1976 Japan .

*Primary Examiner*—Paul R. Michl
*Assistant Examiner*—Alex H. Walker
*Attorney, Agent, or Firm*—Gordon W. Hueschen

[57] ABSTRACT

A neodymium-containing transparent resin comprising (A) a copolymer of (i) at least one monomer selected from the group consisting of alkyl methacrylates having alkyl groups of 1 to 4 carbon atoms and styrene with (ii) at least one copolymerizable unsaturated carboxylic acid or a salt thereof selected from the group consisting of acrylic acid, methacrylic acid and neodymium salts thereof and (B) at least one compound selected from the group consisting of saturated or unsaturated organic carboxylic acids substituted or unsubstituted with a hydroxyl group and having 6 to 21 carbon atoms, and neodymium salts thereof, which transparent resin is characterized by having a neodymium content in the range of 0.3 to 20% by weight, having the number of carboxyl groups possessed by said organic carboxylic acids and salts thereof in a ratio of x to the total number of carboxyl groups possessed by the acrylic acid, methacrylic acid and salt units thereof present in said copolymer and carboxyl groups possessed by said organic carboxylic acids and salts thereof and having the number of carboxyl groups participating in neutralization of neodymium and consequent formation of a salt thereof in a ratio of y to said total number of carboxyl groups, and having the values of x and y satisfy any of the following formulas I, II and III.

$$0.05 \leq y \leq (5/2)x + 0.2 \quad (I)$$
$$0 \leq x \leq 0.3$$

$$0.05 \leq y \leq -(2/5)(x - 0.3) + 0.95 \quad (II)$$
$$0.3 \leq x \leq 0.55$$

$$0.05 \leq y \leq (8/3)(x - 0.55) + 0.85 \quad (III)$$
$$0.55 \leq x \leq 0.85$$

18 Claims, 3 Drawing Figures

NEODYMIUM-CONTAINING TRANSPARENT RESIN AND METHOD FOR MANUFACTURE THEREOF

BACKGROUND OF THE INVENTION

1. Field of the Invention

This invention relates to a neodymium-containing transparent resin and to a method for the manufacture of this resin. More particularly, this invention relates to a neodymium-containing transparent resin capable of selectively absorbing the light of wavelength ranges other than the wavelength ranges of the three primary colors and to a method for the manufacture of this resin.

2. Description of Prior Arts

On the inner surface of the panel glass of a color cathode-ray tube, phosphors which emit the three primary colors of red, green and blue are deposited in a pattern of a multiplicity of dots or stripes to form a fluorescent screen. A color picture image is observed through the panel glass by shooting the electron beams projected from electron guns toward the fluorescent screen through a shadow mask or an aperture grill.

When the picture image of the color cathode-ray tube is viewed through the panel glass, however, there is experienced a persistent problem that the external light existing about the viewer such as, for example, the solar light entering the room through a window or the light from interior lighting devices like fluorescent lamps impinges on the fluorescent screen and seriously impaired the contrast of the picture image composed of red, green and blue lights.

For the purpose of preventing the contrast from being impaired by the external light, there has heretofore prevailed the practice of incorporating minute amounts of NiO and CoO in the panel glass thereby imparting a neutral gray color to the glass and lowering the lightness of the glass. Since the glass of neutral gray color exhibits substantially uniform transmittance over the entire wavelength range of visible light including those of the emission spectra of red, green and blue, however, the attempt to lower the transmittance of this gray glass for the purpose of improving the contrast entails a disadvantage that the glass also absorbs the lights of red, green and blue emitted from the phosphors and degrades the luminance of the picture image.

The emission spectra of a certain set of phosphors are as shown in FIG. 1. From this diagram, it can be expected that the picture image will be allowed to retain its high luminance and curb loss of contrast by conferring upon the panel glass an ability to pass fully the colors of wavelengths corresponding to the fluorescence spectra of red (curve A), green (curve B) and blue (curve C) and absorb fully the light excluding the colors of such wavelengths and readily perceived by human eyes such as, for example, the light of yellow color. It can also be expected that, by properly selecting an absorption wavelength range, the colors of specific undesirable wavelengths will be selectively removed by absorption from the aforementioned emission spectrum and, consequently, the color emitted from the phosphor will be improved in purity and the color reproduction in the color image will be proportionately enhanced. It is, however, extremely difficult to attain such purposes by directly improving the panel glass. If direct improvement of the panel glass is managed to be carried through, it will prove highly expensive.

One of the solutions of this problem is a use of transparent resin containing neodymium as, for example, a front panel for the cathode-ray tube. As neodymium-containing resins, there have been proposed (1) a resin composition formed by incorporating an inorganic neodymium compound such as, for example, neodymium phosphate, neodymium carbonate, neodymium sulfate, neodymium oxide, or neodymium nitrate into a synthetic resin (Japanese Patent Kokai No. 56851/1976) and (2) a resin composition formed by incorporating an organic neodymium compound such as, for example, neodymium ethylenediaminetetraacetate, neodymium acetate or neodymium stearate into a synthetic resin such as methyl methacrylate resin or styrene resin (Japanese Patent Kokai No. 58444/1976).

The former resin composition, however, has had a disadvantage that since the neodymium compound used therein is an inorganic substance and shows no sufficient compatibility to the organic synthetic resin such as methyl methacrylate resin or styrene resin, it is not easily dispersed uniformly in the resin when it is kneaded with the resin. The latter resin composition, too, has had a disadvantage that although the neodymium compound used therein is an organic substance, it is not easily dispersed uniformly when it is kneaded with the methyl methacrylate resin which is solid and, therefore, has been melted by heating before the kneading, with the result that the produced resin composition lacks transparency and consequently exhibits insufficient total and parallel light transmittance and even produces haze. It has long been known to the art that the aforementioned organic neodymium compounds including neodymium acetate, for example, exhibit poor compatibility to methyl methacrylate resin. To cope with this drawback, there has been proposed a method which comprises causing a given neodymium salt to be dissolved intimately with methyl methacrylate through the agency of anhydrous stannic chloride as a solvent and cast molding the resultant composition by polymerization (Japanese Patent Publication No. 5091/1969). This method proves expensive because it effects the cast polymerization of the composition in the presence of stannic chloride as the solvent. Moreover, the produced resin does not readily acquire thorough transparency because of the cloudiness due to dispersion of fine particles therein. It also shows insufficient weatherability and tends to be readily deprived of transparency.

It is, therefore, an object of this invention to provide a neodymium-containing transparent resin and a method for the manufacture of this resin.

Another object of this invention is to provide a neodymium-containing transparent resin capable of selectively adsorbing the portion of light of wavelengths excluding the wavelengths of the three primary colors and, therefore, advantageously useful as optical resin material and a method for the manufacture of this resin.

SUMMARY OF THE INVENTION

These and other objects of this invention are accomplished by a neodymium-containing transparent resin, comprising (A) a copolymer of (i) at least one monomer selected from the group consisting of alkyl methacrylates having alkyl groups of 1 to 4 carbon atoms and styrene with (ii) at least one copolymerizable unsaturated carboxylic acid or a salt thereof selected from the group consisting of acrylic acid, methacrylic acid and neodymium salts thereof and (B) at least one compound selected from the group consisting of saturated or unsaturated organic carboxylic acids substituted or unsubstituted with a hydroxyl group and having 6 to 21 carbon atoms, and neodymium salts thereof, which transparent resin is characterized by having a neodymium content in the range of 0.3 to 20% by weight, having the number of carboxyl groups possessed by the aforementioned organic carboxylic acids and salts thereof in a ratio of x to the total number of carboxyl groups possessed by the acrylic acid, methacrylic acid and salt units thereof present in the aforementioned copolymer and carboxyl groups possessed by the aforementioned organic carboxylic acids and salts thereof and having the number of carboxyl groups partitcipating in neutralization of neodymium and consequent formation of a salt thereof in a ratio of y to the aforementioned total number of carboxyl groups, and having the values of x and y satisfy any of the following formulas I, II and III.

$$0.05 \leq y \leq (5/2)x + 0.2 \quad \text{(I)}$$
$$0 \leq x \leq 0.3$$

$$0.05 \leq y \leq -(2/5)(x - 0.3) + 0.95 \quad \text{(II)}$$
$$0.3 \leq x \leq 0.55$$

$$0.05 \leq y \leq -(8/3)(x - 0.55) + 0.85 \quad \text{(III)}$$
$$0.55 \leq x \leq 0.85$$

The aforementioned objects of this invention are further accomplished by a method for the manufacture of a neodymium-containing transparent resin comprising polymerizing in the presence of a radical polymerization initiator, a mixture comprising (a) a monomer mixture of (i) at least one monomer selected from the group consisting of alkyl methacrylates having alkyl groups of 1 to 4 carbon atoms and styrene with (ii) at least one copolymerizable unsaturated carboxylic acid or a salt thereof selected from the group consisting of acrylic acid, methacrylate acid and neodymium salts thereof and (b) at least one compound selected from the group consisting of saturated or unsaturated organic carboxylic acids substituted or unsubstituted with a hydroxyl group and having 6 to 21 carbon atoms and neodymium salts thereof, which mixture has a neodymium content in the range of 0.3 to 20% by weight has the number of carboxyl groups possessed by the aforementioned organic carboxylic acids and salts thereof in a ratio of x to the total number of carboxyl groups possessed by the acrylic acid, methacrylic acid and salts thereof and carboxyl groups possessed by the aforementioned organic carboxylic acids and salts thereof and has the number of carboxyl groups participating in neutralization of neodymium and consequent formation of a salt thereof in a ratio of y to the aforementioned total nubmer of carboxyl groups, and has the values of x and y satisfy any of the following formulas I, II and III.

$$0.05 \leq y \leq (5/2)x + 0.2 \quad \text{(I)}$$
$$0 \leq x \leq 0.3$$

$$0.05 \leq y \leq -(2/5)(x - 0.3) + 0.95 \quad \text{(II)}$$
$$0.3 \leq x \leq 0.55$$

$$0.05 \leq y \leq -(8/3)(x = 0.55) + 0.85 \quad \text{(III)}$$
$$0.55 \leq x \leq 0.85$$

PREFERRED EMBODIMENT OF THE INVENTION

Figure 1:
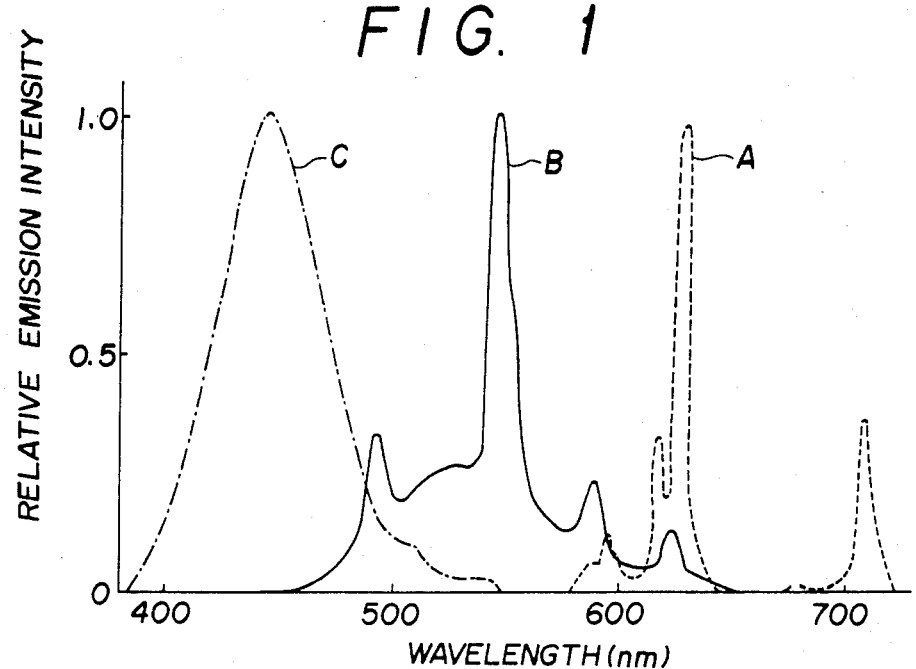
FIG. 1 is a graph showing the emission spectra of a certain phosphor triad of a color cathode-ray tube.

The monomer mixture which is used in this invention for the formation of a copolymer comprises (i) at least one monomer selected from the group consisting of alkyl methacrylates having alkyl groups of 1 to 4 carbon atoms and styrene and (ii) at least one copolymerizable unsaturated carboxylic acid or a salt thereof selected from the group consisting of acrylic acid, methacrylic acid and neodymium salts thereof. Although the monomer component (i) is an alkyl methacrylate and/or styrene, it is desired to be an alkyl methacrylate. Examples of the alkyl methacrylate include methyl methacrylate, ethyl methacrylate, n-propyl methacrylate, isopropyl methacrylate, n-butyl methacrylate, sec-butyl methacrylate and tert-butyl methacrylate. Among other alkyl methacrylates, methyl methacrylate proves particularly desirable. Examples of the copolymerizable unsaturated carboxylic acid or salt thereof (ii) include acrylic acid, methacrylic acid, neodymium acrylate and neodymium methacrylate. Methacrylic acid and neodymium methacrylate are preferred to the other examples.

Optionally in the monomer component (i), an additional copolymerizable monomer may be used in a proportion not so much as to impair the transparency of the produced resin. Examples of the copolymerizable monomer include hydroxyalkyl acrylates such as 2-hydroxyethyl acrylate, 2-hydroxypropyl acrylate, 3-hydroxypropyl acrylate, 4-hydroxybutyl acrylate and 2-hydroxy-3-chloropropyl acrylate; hydroxyalkyl methacrylates such as 2-hydroxyethyl methacrylate, 2-hydroxypropyl methacrylate, 3-hydroxypropyl methacrylate, 4-hydroxybutyl methacrylate and 2-hydroxy-3-chloropropyl methacrylate; alkyl acrylates such as methyl acrylate, ethyl acrylate, n-propyl acrylate, isopropyl acrylate, n-butyl acrylate and 2-ethylhexyl acrylate; cyclohexyl acrylate, vinyl chloride, vinyl acetate, acrylonitrile and methacrylonitrile. Besides, ethylene glycol diacrylate, ethylene glycol dimethacrylate, diethylene glycol diacrylate, diethylene glycol dimethacrylate, polyethylene glycol diacrylate, polyethylene glycol dimethacrylate, propylene glycol diacrylate, propylene glycol dimethacrylate, 1,6-hexanediol diacrylate, 1,6-hexanediol dimethacrylate, 1,4-butanediol diacrylate, 1,4-butanediol dimethacrylate, trimethylolpropane triacrylate, trimethylolpropane trimethacrylate, tetramethylolmethane tetraacrylate, tetramethylolmethane tetramethacrylate, 1,12-dodecanediol diacrylate, 1,12-dodecanediol dimethacrylate, neopentyl glycol diacrylate or neopentyl glycol dimethacrylate may be incorporated in a small amount of not more than 20% by weight, for example.

Examples of the saturated or unsaturated organic carboxylic acid substituted or unsubstituted with a hydroxyl group and having 6 to 21 carbon atoms include aliphatic saturated carboxylic acids such as caproic acid, octanoic acid, 2-ethylhexanoic acid, pelargonic acid, capric acid, lauric acid, myristic acid, palmitic acid, stearic acid, adipic acid, sebacic acid, monoethyl adipate and monomethyl sebacate; aliphatic unsaturated carboxylic acids such as oleic acid, elaidic acid, linolenic acid, linoleic acid, ricinoleic acid and ricinelaidic acid; alicyclic carboxylic acids such as cyclohexane carboxylic acid and naphthenic acid; and benzoic acid, phthalic acid, isophthalic acid, terephthalic acid, toluilic acids, trimetllitic acid, octylbenzoic acid, monooctyl phthalate and monooctyl terephthalate.

In all these organic carboxylic acids, aliphatic carboxylic acids are desirable. Among other aliphatic carboxylic acids, saturated aliphatic carboxylic acids and particularly unsubstituted saturated aliphatic carboxylic acids are most desirable. Further, among the aforementioned organic carboxylic acids those having 6 to 12 carbon atoms are preferred choices, The neodymium-containing transparent resin contemplated by the present invention is obtained by mixing the monomer mixture comprising the aforementioned components (a) and (b) with a radical polymerization initiator and subsequently allowing the resultant reaction mixture to undergo reaction at a temperature in the range of 5° to 140° C., preferably 50° to 120° C., for a period of 1 to 20 hours, preferably 2 to 10 hours. The radical polymerization initiator is used generally in the range of 0.0001 to 1% by weight, preferably 0.001 to 0.5% by weight, based on the combined amount of the monomers used. Typical examples of the radical polymerization initiator are lauroyl peroxide, tert-butyl peroxyisopropyl carbonate, benzoyl peroxide, dicumyl peroxide, tert-butylperoxy acetate, tert-butylperoxy benzoate, tert-butylperoxy isobutyrate, di-tert-butyl peroxide and 2,2'-azobisisobutyronitrile.

In the neodymium-containing transparent resin formed as described above, the carboxyl groups contained in the copolymer (A) of the monomer component of (i) with the monomer component of (ii) may exist as free carboxyl groups or neutralized carboxyl groups combined with neodymium.

Figure 2:
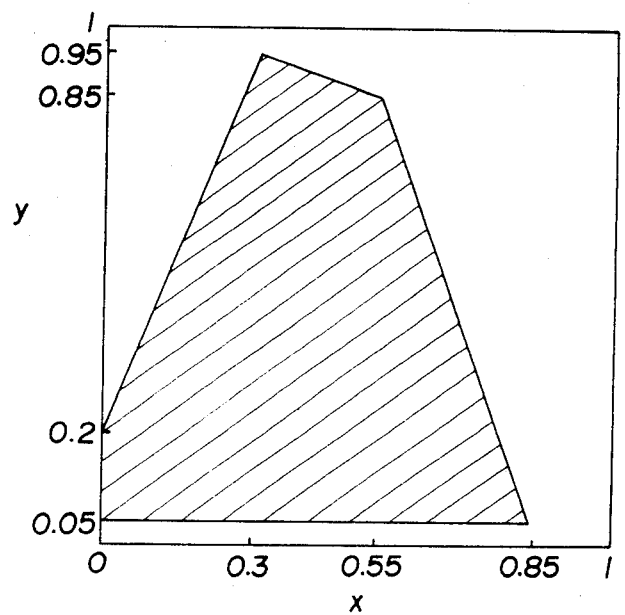
FIG. 2 is a graph showing the optimum range of the relation between the carboxylic group of the resin of the present invention and the neutralization with neodymium.

The other component (B), it is inferred, also contains its carboxyl groups in the form of free organic carboxylic acids or neodymium salts, and the resin may even contain neodymium having the valency of 3 in a neutralized state as combined with the carboxyl groups possessed by the aforementioned copolymer and the carboxyl groups possessed by the aforementioned organic carboxylic acids. Let x stand for the ratio of the number of carboxyl groups possessed by the aforementioned organic carboxylic acids and salts thereof to the total number of carboxyl groups possessed by the acrylic acid, methacrylic acid and salt units thereof present in the aforementioned copolymer and carboxyl groups possessed by the aforementioned organic carboxylic acids and salts thereof and y for the ratio of the number of carboxyl groups participating in neutralization of neodymium and consequent formation of a salt thereof to the aforementioned total number of carboxyl groups, and the range in which x and y satisfy any of the aforementioned formulas I, II and III will be as shown in FIG. 2. The neodymium-containing resin composition is transparent only when x and y fall in this range (the hatched portion). When they deviate from this range, the produced resin composition cannot manifest the effect of this invention because the transparency thereof is seriously impaired or the neodymium content thereof is notably lowered.

When the aforementioned transparent resin of the present invention is used as an optical resin material such as, for example, a material for the front panel or coating material for a color cathode-ray tube, it may incorporate, when necessary, 0 to 0.5% by weight, more desirably 0.0001 to 0.5% by weight, and most desirably 0.0003 to 0.1% by weight, based on the transparent resin, of coloring agents capable of absorbing the light in at least one of the four wavelength ranges of 380 to 420 nm, 480 to 530 nm, 560 to 610 nm and 640 to 780 nm and hardly capable or totally incapable of absorbing the visible light of the wavelength ranges excluding those mentioned above, so as to supplement the selective absorption by the aforementioned neodymium salts or enable the resin to provide selective absorption in the visible light wavelength ranges in which the aforementioned neodymium salts provide no absorption. Coloring agents which have the capability mentioned above are dyestuffs, pigments and ultraviolet absorbers indicated herein below. These coloring agents can be incorporated in the monomer mixture so that it may be uniformly dispersed in the resin which is produced by the subsequent copolymerization of the monomer mixture.

Examples of the coloring agents having a main absorption in the wavelength range of 380 to 420 nm are ultraviolet absorbers including salicylic esters such as phenyl salicylate and paratert-butylphenyl salicylate; benzotriazoles such as 2-(2'-hydroxy-5'-methylphenyl)-benzo triasole and 2-(2-hydroxy-3'-, 5'-di-tert-butylphenyl)-5-ohlorobenzotriazole; and benzophenones such as 2-hydroxy-4-methoxybenzophenone, 2-hydroxy-4-methoxy-4'-chlorobenzophenone and 2,2'-dihydroxy-4-octoxybenzophenone.

Examples of the coloring agents having a main absorption in the wavelength range of 480 to 530 nm are red coloring materials including Hostasol Red GG (made by Hoechst), Paligen Red 3730 (made by BASF), Diaresin Red HS (made by Mitsubishi Chemical Industry), Diaresin Red S (made by Mitsubishi Chemical Industry), Amaplast Pink P4B (made by American Aniline) and Orange C-type (made by Hercules).

Examples of the coloring agents having a main absorption in the wavelength range of 640 to 780 nm are blue coloring materials including Euvinyl Blue 702 (made by BASF), Oil Blue 615 (made by Orient Chemical Industry), Macrolex Green 513 (made by Bayer), Seikagen-O-Blue GK-1200 (made by Dainichi-Seika Industry) and Sumitoncyanin Blue HB-1 (made by Sumitomo Ehmical Industry).

The coloring agents having a main absorption in the wavelength range of 560 to 610 nm have no proper example. Among the coloring agents having a main absorption in any one of the aforementioned three wavelength ranges, those which also have absorption in the wavelength range of 560 to 610 nm may constitute examples of the coloring agents under discussion. Euvinyl Blue 702 (made by BASF) is one such coloring agent.

Now, examples of synthesis of typical neodymium salts will be cited below. Example Synthesis 1

Ten (10) g of neodymium oxide, 17 g of methacrylic acid and 100 g of water were mixed. The resultant mixture in the form of suspension was stirred as refluxed at 60° C. for three hours. The reaction mixture was filtered to separate off the unaltered solids. The filtrate was concentrated under a vacuum by distillation of water to produce crystals. By washing the crystals with acetone and drying under a vacuum, there was obtained neodymium methacrylate. The yield was 78%.

Example Synthesis 2

Forty (40) g of neodymium oxide, 220 g of octanoic acid and 220 g of water were mixed. The resultant mixture in the form of suspension was stireed as refluxed at 85° C. for three hours and cooled. The resultant reaction mixture was left standing at rest and separated into a water phase and an organic phase. The organic phase was poured into acetone of a volume about 20 times as large. The salt consequently precipitated therein was washed with acetone and was dried under a vacuum, to afford neodymium octanoate monohydrate. The yield was 92%.

EXAMPLE 1

In a mixed solution consisting of 88.2 g of methyl methacrylate and 3.6 g of methacrylic acid, there was dissolved 8.2 g of neodymium octanoate monohydrate and 0.005 of 2,2'-azobisisobutyronitrile was additionally dissolved therein as a polymerization initiator. The resultant mixture was poured into a cell formed by assembling glass sheets and a gasket made of vinyl chloride resin. The mixture was deaerated under a vacuum and was polymerized at 70° C. for eight hours and then at 120° C. for one hour. At the end of the polymerization, the cell was disassembled to obtain a resin sheet 3 mm in thickness. This resin was found to have a total light transmittance of 82% and a haze of 1.5% according to ASTM D1003. The resin's neodymium content was found to be 2.0% by weight.

EXAMPLE 2

In a mixture consisting of 88.2 g of methyl methacrylate and 6.4 g of octanoic acid, there was dissolved 5.5 g of neodymium methacrylate. Then, by following the procedure of Example 1, the resultant mixture was subjected to polymerization to afford a resin sheet 3 mm in thickness. This resin sheet was found to have a total light transmittance of 81%, a haze of 2.1% and a neodymium content of 2.0% by weight.

EXAMPLE 3

Figure 3:
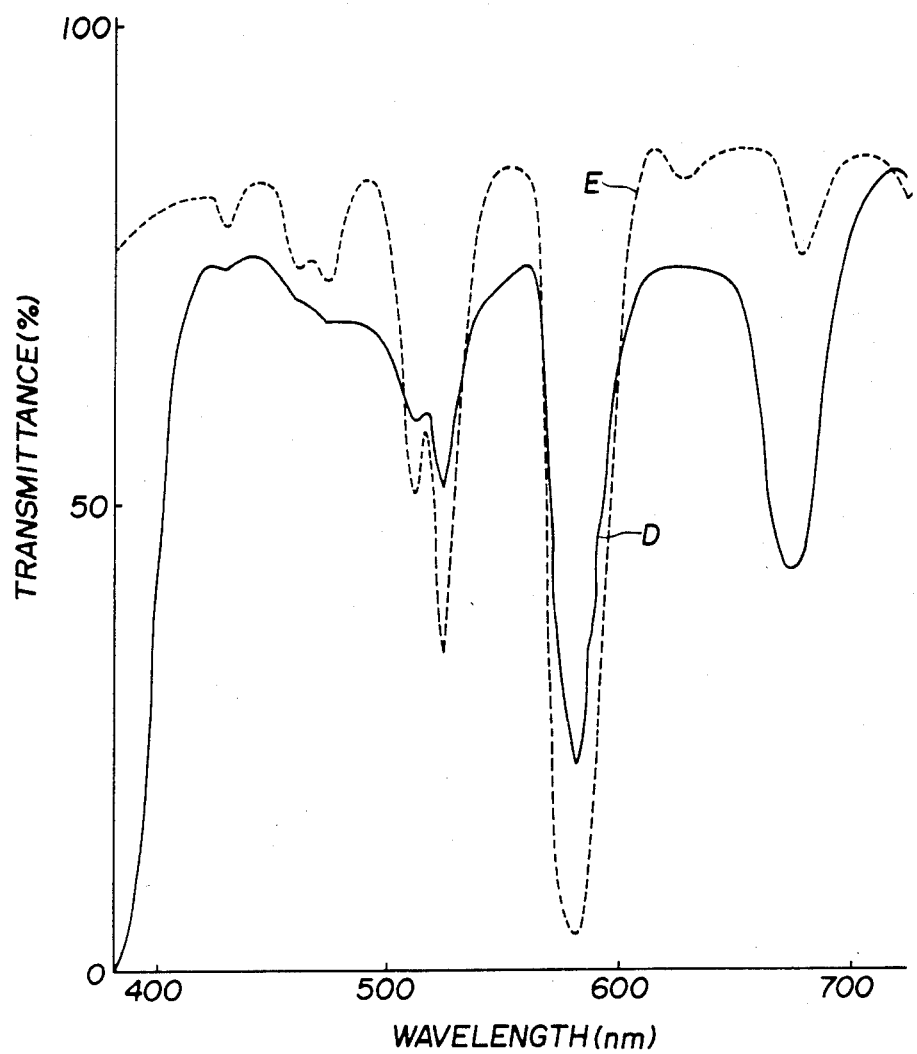
FIG. 3 is a graph showing the light transmittance of the resin of this invention in the wavelength range of visible light.

A uniform solution was obtained by mixing 12 g of neodymium methacrylate, 28 g of neodymium octanoate monohydrate, 35 g of sytrene, 21 g of methacrylic acid and 4 g of neopentyl glycol dimethacrylate. This uniform solution, with 0.2 g of tertbutylperoxy isobutyrate additionally dissolved therein, was poured into a cell formed by assembling glass sheets and a gasket made of vinyl chloride resin. The mixture was deaerated under a vacuum and then subjected to polymerization at 70° C. for two hours, at 80° C. for five hours and then at 120° C. for one hour. At the end of the polymerization, the cell was disassembled to obtain a resin sheet 2 mm in thickness. This resin sheet was found to have a total light transmittance of 72%, a haze of 0.8%, and a neodymium content of 11.0% by weight. The spectral transmittance of visible light was as shown in FIG. 3 (curve E).

EXAMPLE 4

In a mixture consisting of 75.2 g of methyl methacrylate, 12.0 g of ethyl acrylate and 2.5 g of methacrylic acid, there was dissolved 10.3 g of neodymium oleate. Then by following the procedure of Example 1, the resultant mixture was subjected to polymerization to afford a resin sheet 3 mm in thickness. The resin sheet was found to have a total light transmittance of 85%, a haze of 2.5%, and a neodymium content of 1.5% by weight.

EXAMPLE 5

In a mixed solution consisting of 88.2 g of methyl methacrylate and 3.6 g of methacrylic acid, there were dissolved 8.2 g of neodymium octanoate monohydrate, 0.0005 g of Hostasol Red GG (made by Hoechst), 0.0008 g of Oil Blue 615 (made by Orient Chemical Industry) and 0.04 g of 2-(2'-hydroxy-3',5'-di-tert-butylphenyl)-5-chlorobenzotriazole. Then, by following the procedure of Example 1, the resultant mixture was subjected to polymerization to afford a resin sheet 3 mm in thickness. This resin sheet was found to have a total light transmittance of 68%, a haze of 2.3%, and a neodymium content of 2.0% by weight. The spectral transmittance of visible light was as shown in FIG. 3 (curve D).

EXAMPLE 6

In a mixture consisting of 88.2 g of methyl methacrylate and 3.6 g of methacrylic acid, there were dissolved 8.2 g of neodymium octanoate monohydrate, 0.0015 g of Diaresin Red HS (made by Mitsubishi Chemical Industry), 0.001 g of Oil Blue 615 (made by Orient Chemical Industry) and 0.04 g of 2-(2'-hydroxy-3',5'-di-tert-butylphenyl)-5-chlorobenzotriazole. Then, by following the procedure of Example 1, the resultant mixture was subjected to polymerization to afford a resin sheet 3 mm in thickness. This resin sheet was found to have a total light transmittance of 64%, a haze of 3.1%, and a neodymium content of 2.0% by weight.

EXAMPLE 7

In a mixed solution consisting of 75.2 g of methyl methacrylate, 12.0 g of ethyl acrylate and 2.5 g of methacrylic acid, there were dissolved 10.3 g of neodymium oleate, 0.0004 g of Hostasol Red GG (made by Hoechst), 0.0006 g of Oil Blue 615 (made by Orient Chemical Industry), and 0.03 g of 2-(2'-hydroxy-5'-methylphenyl)-benzotriazole. Then, by following the procedure of Example 1, the resultant mixture was subjected to polymerization, to afford a resin sheet 3 mm in thickness. This resin sheet was found to have a total light transmittance of 74%, a haze of 3.0%, and a neodymium content of 1.5% by weight.

EXAMPLE 8

In a mixed solution consisting of 65.2 g of methyl methacrylate and 7.2 g of methacrylic acid, there were dissolved 27.6 g of nedoymium stearate, 0.0005 g of Hostasol Red GG (made by Hoechst), 0.0008 g of Oil Blue 615 (made by Orient Chemical Industry) and 0.04 g of 2-(2'-hydroxy-3',5'-tert.-butylphenyl)-5-chlorobenzotriazole. Then, by following the procedure of Example 1, the resultant mixture was subjected to polymerization, to afford a resin sheet 3 mm in thickness. This resin sheet was found to have a total light transmittance of 63%, a haze of 5.0%, and a neodymium content of 4.0% by weight.

EXAMPLE 9

A uniform solution was obtained by mixing 4.9 g of neodymium octanoate monohydrate, 0.9 g of octanoic acid, 7.8 g of neodymium methacrylate, 1.3 g of methacrylic acid, 25.1 g of methyl methacrylate and 60.0 g of styrene. Then, by following the procedure of Example 3, the resultant solution was subjected to polymerization, to afford a resin sheet 3 mm in thickness. This resin sheet was found to have a total light transmittance of 82%, a haze of 0.4%, and a neodymium content of 4.0% by weight.

As described above, the present invention is directed to a neodymium-containing transparent resin composition which comprises (A) a copolymer of (i) at least one monomer selected from the group consisting of alkyl methacrylates having alkyl groups of 1 to 4 carbon atoms and styrene with (ii) at least one copolymerizable unsaturated carboxylic acid or a salt thereof selected from the group consisting of acrylic acid, methacrylic acid and neodymium salts thereof and (B) at least one compound selected from the group consisting of saturated or unsaturated organic carboxylic acids substituted or unsubstituted with a hydroxyl group and having 6 to 21 carbon atoms and neodymium salts thereof, which transparent resin is characterized by having a neodymium content in the range of 0.3 to 20% by weight, having the number of carboxyl groups possessed by the aforementioned organic carboxylic acids and salts thereof in a ratio of x to the total number of carboxyl groups possessed by the acrylic acid, methacrylic acid, and salt units thereof present in the aforementioned copolymer and carboxyl groups possessed by the aforementioned organic carboxylic acids and salts thereof and having the number of carboxyl groups participating in neutralization of neodymium and consequent formation of a salt thereof in a ratio of y to the aforementioned total number of carboxyl groups, and having the values of x and y within a specific range. Thus, this resin composition enjoys outstanding transparency and yet is capable of providing selective absorption of the light of wavelength ranges other than the wavelengths of the three primary colors owing to neodymium contained therein. When it is used as an optical resin material, such as the front panel for a color cathode-ray tube, it prevents the contrast of the picture image from otherwise possible impairment. Further, the resin obtained by this invention is an organic substance and, therefore, permits free incorporation thereof of coloring agents capable of absorbing the light of the wavelength ranges other than those of the three primary colors and hardly capable or totally incapable of absorbing the visible light in wavelength ranges of the three primary colors. Thus, incorporation of such coloring agents adds further to the highly selective absorption offered by the resin of the invention.

This invention further is directed to a method for the manufacture of a neodymium-containing transparent resin composition, which involves polymerizing a mixture comprising (a) a monomer mixture of (i) at least one monomer selected from the group consisting of alkyl methacrylates having alkyl groups of 1 to 4 carbon atoms and styrene with (ii) at least one copolymerizable unsaturated carboxylic acid or a salt thereof selected from the group consisting of acrylic acid, methacrylic acid and neodymium salts thereof and (b) at least one compound selected from the group consisting of saturated or unsaturated organic carboxylic acids substituted or unsubstituted with a hydroxyl group and having 6 to 21 carbon atoms, and neodymium salts thereof, which mixture has a neodymium content in the range of 0.3 to 20% by weight, has the number of carboxyl groups possessed by the aforementioned organic carboxylic acids and salts thereof in a ratio of x to the total number of carboxyl groups possessed by the acrylic acid, methacrylic acid, and salts thereof and carboxyl groups possessed by the aforementioned organic carboxylic acids and salts thereof and has the number of carboxyl groups participating in neutralization of neodymium and consequent formation of a salt thereof in a ratio of y to the aforementioned total number of carboxyl groups, and has the values of x and y falling within a specific range. Thus, the resin can be produced by cast polymerization at a very low production cost. And the resin produced enjoy various advantages mentioned above.

We claim:

1. An neodymium-containing transparent resin obtained by polymerizing a monomeric mixture comprising (A) a blend of (i) at least one monomer selected from the group consisting of alkyl methacrylates having alkyl groups of 1 to 4 carbon atoms and styrene with (ii) at least one copolymerizable unsaturated carboxylic acid monomer or a salt thereof selected from the group consisting of acrylic acid, methacrylic acid and neodymium salts thereof and (B) at least one compound selected from the group consisting of saturated or unsaturated organic carboxylic acids substituted or unsubstituted with a hydroxyl group and having 6 to 21 carbon atoms, and neodymium salts thereof, which transparent resin is characterized by having a neodymium content in the range of 0.3 to 20% by weight, having the number of carboxyl groups possessed by said organic carboxylic acids and salts thereof in a ratio of x to the total number of carboxyl groups possessed by the acrylic acid, methacrylic acid and salt units thereof present in said copolymer and carboxyl groups possessed by said organic carboxylic acids and salts thereof and having the number of carboxyl groups participating in neutralization of neodymium and consequent formation of a salt thereof in a ratio of y to said total number of carboxyl groups, and having the values of x and y satisfy any of the following formulas I, II and III.

$$0.05 \leq y \leq (5/2)x + 0.2 \quad \text{(I)}$$
$$0 \leq x \leq 0.3$$

$$0.05 \leq y \leq -(2/5)(x - 0.3) + 0.95 \quad \text{(II)}$$
$$0.3 \leq x \leq 0.55$$

$$0.05 \leq y \leq -(8/3)(x - 0.55) + 0.85 \quad \text{(III)}$$
$$0.55 \leq x \leq 0.85$$

2. A neodymium-containing transparent resin according to claim 1, wherein said neodymium content falls in the range of 0.5 to 15% by weight.

3. A neodymium-containing transparent resin according to claim 1 or claim 2, wherein said organic carboxylic acid (B) is a saturated aliphatic carboxylic acid.

4. A neodymium-containing transparent resin according to any one of claims 1 to 3, wherein said monomer (i) is an alkyl methacrylate having an alkyl group of 1 to 4 carbon atoms.

5. A neodymium-containing transparent resin according to claim 4, wherein said alkyl methacrylate is methyl methacrylate.

6. A neodymium-containing transparent resin according to any one of claims 1 to 5, wherein coloring agents capable of absorbing light in at least one of the four wavelength ranges of 380 to 420 nm, 480 to 530 nm, 560 to 610 nm and 640 to 780 nm and hardly capable or totally incapable of absorbing visible light in the wavelength ranges other than those mentioned above are incorporated in an amount of 0.0001 to 0.5% by weight based on the amount of said transparent resin.

7. A neodymium-containing transparent resin according to claim 6, wherein said coloring agents are incorporated in an amount of 0.0003 to 0.1% by weight based on the amount of said transparent resin.

8. A method for the manufacture of a neodymium-containing transparent resin comprising polymerizing, in the presence of a radical polymerization initiator, a mixture comprising (a) a monomer mixture of (i) at least one monomer selected from the group consisting of alkyl methacrylates having alkyl groups of 1 to 4 carbon atoms and styrene with (ii) at least one copolymerizable unsaturated carboxylic acid monomer or a salt thereof selected from the group consisting of acrylic acid, methacrylic acid and neodymium salts thereof and (b) at least one compound selected from the group consisting of saturated or unsaturated organic carboxylic acids substituted or unsubstituted with a hydroxyl group and having 6 to 21 carbon atoms and neodymium salts thereof, which mixture has a neodymium content in the range of 0.3 to 20% by weight, has the number of carboxyl groups possessed by said organic carboxylic acids and salts thereof in a ratio of x to the total number of carboxyl groups possessed by the acrylic acid, methacrylic acid and salts thereof and carboxyl groups possessed by said organic carboxylic acids and salts thereof and has the number of carboxyl groups participating in neutralization of neodymium and consequent formation of a salt thereof in a ratio of y to said total number of carboxyl groups, and has the values of x and y satisfy and of the following formulas I, II and III.

$$0.05 \leq y \leq (5/2)x + 0.2 \quad (I)$$
$$0 \leq x \leq 0.3$$

$$0.05 \leq y \leq -(2/5)(x - 0.3) + 0.95 \quad (II)$$
$$0.3 \leq x \leq 0.55$$

$$0.05 \leq y \leq -(8/3)(x - 0.55) + 0.85 \quad (III)$$
$$0.55 \leq x \leq 0.85$$

9. A method for the manufacture of a neodymium-containing transparent resin according to claim 8, wherein said neodymium content falls in the range of 0.5 to 15% by weight.

10. A method for the manufacture of a neodymium-containing transparent resin according to claim 8 or claim 9, wherein said organic carboxylic acid is a saturated aliphatic carboxylic acid.

11. A method for the manufacture of a neodymium-containing transparent resin according to any one of claims 8 to 10, wherein said polymerization is carried out at a temperature in the range of 5° to 140° C.

12. A method for the manufacture of a neodymium-containing transparent resin according to any one of claims 8 to 11, wherein said monomer (i) is an alkyl methacrylate having an alkyl group of 1 to 4 carbon atoms.

13. A method for the manufacture of a neodymium-containing transparent resin according to claim 12, wherein said alkyl methacrylate is methyl methacrylate.

14. A method for the manufacture of a neodymium-containing transparent resin according to any one of claims 8 to 13, wherein said copolymerizable unsaturated carboxylic acid (ii) is acrylic acid or methacrylic acid.

15. A method for the manufacture of a neodymium-containing transparent resin according to claim 8 or claim 9, wherein said salt of organic carboxylic acid (b) is an unsubstituted, saturated aliphatic neodymium carboxylate.

16. A method for the manufacture of a neodymium-containing transparent resin according to claim 11, wherein said polymerization is carried out at a temperature in the range of 50° to 120° C.

17. A method for the manufacture of a neodymium-containing transparent resin according to any one of claims 8 to 16, wherein said mixture is polymerized in the presence of 0.0001 to 0.5% by weight, based on the amount of said transparent resin, of coloring agents capable of absorbing light in at least one of the four wavelength ranges of 380 to 420 nm, 480 to 530 nm, 560 to 610 nm and 640 to 780 nm and hardly capable or totally incapable of absorbing visible light in the wavelength ranges other than those mentioned above.

18. A method for manufacture of a neodymium-containing transparent resin according to claim 17, wherein said coloring agents are incorporated in an amount of 0.0003 to 0.1% by weight based on the amount of said transparent resin.

* * * * *